US011213850B2

(12) United States Patent
Celmer (10) Patent No.: US 11,213,850 B2
(45) Date of Patent: Jan. 4, 2022

(54) SPIN COATING SYSTEM AND METHOD (71) Applicant: Essilor International, Charenton-le-Pont (FR)

(72) Inventor: Stephen Celmer, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 39 days.

(21) Appl. No.: 16/477,010

(22) PCT Filed: Jan. 9, 2018

(86) PCT No.: PCT/EP2018/050426
§ 371 (c)(1),
(2) Date: Jul. 10, 2019

(87) PCT Pub. No.: WO2018/130507
PCT Pub. Date: Jul. 19, 2018

(65) Prior Publication Data
US 2019/0351448 A1  Nov. 21, 2019

(30) Foreign Application Priority Data

Jan. 10, 2017  (EP) .................................... 17305026

(51) Int. Cl.
*B05C 9/06* (2006.01)
*B05C 9/14* (2006.01)
(Continued)

(52) U.S. Cl.
CPC .................. *B05C 9/06* (2013.01); *B05C 9/14* (2013.01); *B05C 11/08* (2013.01); *B05C 13/02* (2013.01);
(Continued)

(58) Field of Classification Search
CPC ........... B05C 5/0208; B05C 9/06; B05C 9/08; B05C 9/14; B05C 11/08; B05C 13/02;
(Continued)

(56) References Cited

U.S. PATENT DOCUMENTS

2001/0041229 A1  11/2001  Sakamoto et al.
2008/0081108 A1   4/2008  Yamada et al.
(Continued)

FOREIGN PATENT DOCUMENTS

EP           1947484          7/2008

OTHER PUBLICATIONS

International Search Report and Written Opinion issued in International Patent Application No. PCT/EP2018/050426, dated Apr. 19, 2018.

*Primary Examiner* — Laura Edwards
(74) *Attorney, Agent, or Firm* — Norton Rose Fulbright US LLP (57) ABSTRACT

Provided herein is an improved spin coating system and a method of using the spin coating machine to produce an optical article. The system includes at least one dispensing arm assembly. The holder assembly is moveable along a substantially vertical axis. The dispensing arm assembly has a base and at least one arm having a first end and a second end and is moveable along a horizontal axis. The at least one arm is operably coupled to the base at the first end and operably coupled to at least one applicator at the second end, and the applicator is capable of being positioned along the substantially vertical axis. The method includes depositing a primer layer onto a lens using the dispensing arm assembly, followed by a hard coating, and drying and cooling the substrate using a drying/cooling station that is positioned substantially along the substantially vertical axis.

16 Claims, 7 Drawing Sheets

(51) Int. Cl.
     *B05C 11/08*      (2006.01)
     *B05C 13/02*      (2006.01)
     *B29D 11/00*      (2006.01)
     *B05D 1/00*       (2006.01)

(52) U.S. Cl.
     CPC ........ *B05D 1/005* (2013.01); *B29D 11/00009* (2013.01); *B29D 11/00884* (2013.01)

(58) Field of Classification Search
     CPC ............... B05C 9/10; B29D 11/00009; B29D 11/00884; G02B 1/14; G02B 1/10; C03C 17/02
     USPC .......................... 118/302, 313, 320, 321, 323
     See application file for complete search history.

(56) References Cited

U.S. PATENT DOCUMENTS

| | | | |
|---|---|---|---|
| 2009/0133625 A1* | 5/2009 | Takahashi | B05C 11/08 118/712 |
| 2010/0151126 A1 | 6/2010 | Iseki et al. | |
| 2012/0293768 A1* | 11/2012 | Lapprand | |
| 2016/0243578 A1 | 8/2016 | Mackinnon et al. | |
| 2017/0043379 A1* | 2/2017 | Sasaki | B08B 3/00 |

* cited by examiner

SPIN COATING SYSTEM AND METHOD

CROSS-REFERENCE TO RELATED APPLICATIONS

This application is a national phase application under 35 U.S.C. § 371 of International Application No. PCT/EP2018/050426 filed 9 Jan. 2018, which claims priority to European Patent Application No. 17305026.1 filed 10 Jan. 2017. The entire contents of each of the above-referenced disclosures is specifically incorporated by reference herein without disclaimer.

RELATED FIELD

The present invention relates to an improved spin coating machine and method of spin coating.

BACKGROUND

Various methods are known for coating surfaces of optical articles so as to provide the optical article with one or more layers such as impact resistant, scratch resistant, anti-smudge or anti-reflective layers. It is a common practice in the art to coat at least one main surface of a lens substrate, such as an ophthalmic lens or lens blank, with several coatings for imparting to the finished lens additional or improved optical or mechanical properties.

Spin coating is one method used to coat an optical article such as an ophthalmic lens. In the spin coating method, a predetermined volume of coating solution is dispensed in a central location of the article while the article is rotated at an intermediate speed, and the article is then rotated at a very high speed so as to spread the solution over substantially the entire surface of the article.

Existing spin coaters known in the art typically provide only single layer coatings, such as UV coatings, to the surface of an ophthalmic lens. Such spin coaters also typically comprise multiple stations for applying such layers onto ophthalmic lenses, require many components, and have a large footprint. Such machines are typically designed for large-scale optical manufacturing laboratories, are expensive, and require ancillary installation equipment. These large-scale spin coating machines are not practical for small-scale laboratories that may produce smaller volumes of lenses on a daily basis. Compact spin coating machines that comprise a single station capable of producing pre-cured lenses having two or more coating layers are not currently available.

There remains a need to provide alternative spin coating machines that have a smaller footprint that can be used in smaller scale optical facilities and labs, compared to existing back side spin coating machines. What is presented herein is a more compact, streamlined spin-coating machine that comprises a single station that allows for coating and drying of lenses in smaller scale labs.

SUMMARY

What is described herein overcomes the problems described above. In one or more embodiments described herein is a system for spin-coating at least one substrate, the system comprising: at least one holder assembly configured to receive the at least one substrate, wherein the holder assembly is moveable along a substantially vertical axis; and a dispensing assembly comprising a base; and at least one arm having a first end and a second end, wherein the dispensing arm assembly is moveable along a horizontal axis, and wherein the at least one arm is operably coupled to the base at the first end and operably coupled to at least one applicator that is in fluid communication with one coating solution at the second end, and wherein the at least one applicator is capable of being positioned along the substantially vertical axis, so as to coat at least the coating solution onto the substrate and to obtain a coated substrate, characterized in that the system comprises a drying and cooling assembly that is positioned along said substantially vertical axis and that is able to force air onto said coated substrate. The system further comprises a first applicator and a second applicator, wherein the first applicator and the second applicator are positioned in a substantially parallel relationship to each other. Each of the first and second applicators are configured to dispense at least one coating solution onto at least a portion of the at least one substrate. The system further comprises a housing defining an interior, wherein the interior comprises: a platform, wherein the platform is substantially parallel to the at least one substrate; a spindle assembly configured to receive the at least one holder assembly; and the dispensing assembly, wherein the spindle assembly and the dispensing assembly are each secured to at least a portion of the platform. The system further comprises at least one container capable of containing the at least one coating solution, wherein the at least one container is in fluid communication with the applicator. The system further comprises a lubricating station, wherein the lubricating station comprises a means for containing at least one lubricating solution for lubricating the at least one applicator, and wherein at least a portion of the lubricating station is secured to at least a portion of the platform. As previously mentioned, the system comprises a drying and cooling assembly that is positioned along the substantially vertical axis. The system further comprises at least one graphical user interface (GUI), wherein the graphical user interface is secured to at least a portion of the housing.

A method for spin-coating at least one substrate by using a system for spin-coating such as defined above is also provided herein. The method involves providing at least one substrate and positioning the at least one substrate onto at least one holder assembly along a substantially vertical axis in a first position; depositing a primer layer onto at least a portion of the substrate using a first applicator, while rotating the substrate; moving the substrate along the substantially vertical axis to a second position; drying and cooling the substrate in the drying and cooling assembly such as defined above; moving the substrate along the substantially vertical axis to the first position; depositing a coating solution onto at least a portion of the substrate using a second applicator, while rotating the substrate. The method further comprises moving the at least one substrate along the substantially vertical axis to a second position along the substantially vertical axis; and drying and cooling the at least one substrate; and pre-curing the substrate. The method further involves applying a hard coating solution.

An optical article produced by any of the methods disclosed herein is also provided. The optical article is an ophthalmic lens.

BRIEF DESCRIPTION OF THE DRAWINGS

The advantages, nature, and various additional features as described herein will appear more fully upon consideration of the illustrative embodiments now to be described in detail in connection with the accompanying drawings. In the drawings like reference numerals denote similar components throughout the views.

DETAILED DESCRIPTION

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The indefinite articles "a" or "an" mean one or more than one of the component, part, or step that the article introduces.

As used herein, spatial or directional terms, such as "left," "right," "vertical," "horizontal," "above," "below," and the like, relate to the invention as it is shown in the drawing figures. However, it is to be understood that the invention may assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about" unless indicated to the contrary. Accordingly, unless indicated to the contrary, the numerical values set forth in the following specification and claims may vary depending upon the desired properties sought to be obtained. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over," "deposited over," or "applied over" mean formed, deposited, or applied on but not necessarily in contact with the surface. For example, a coating "formed over" a substrate does not preclude the presence of one or more other coatings of the same or different composition located between the formed coating and the substrate. As used herein, the terms "polymer" or "polymeric" refer to oligomers, homopolymers, copolymers, and terpolymers, e.g., polymers formed from two or more types of monomers or polymers.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values, and including the values "a" and "b" themselves.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

As used in this application, when an optical article comprises one or more coating(s) on its surface, the phrase "depositing" a primer layer, at least one layer, or a coating solution onto at least one substrate means that a layer or a coating is deposited onto the exposed surface of the substrate external coating (i.e., coating that is the most distant from the substrate). As used herein, a coating or layer that is said to be "on" a substrate or that has been deposited "onto" a substrate is defined as being a coating or layer (i) that is located above the substrate, (ii) that is not necessarily in contact with the substrate, that is to say one or more intermediate coating(s) may be located between the substrate and the coating of interest, and (iii) that does not necessarily totally cover the substrate, although a complete coverage is possible.

As described herein, the outer layer or top layer in a plurality of layers on a substrate is the exposed layer or layers, or layer(s) closest to the layer(s)-air interface. Further, the outer layer or top layer in an assembly as described herein is an outermost layer, or the exposed layer(s), or the layer(s) closest to the layer(s)-air interface.

General Benefits of the Spin Coating System

What is provided herein is an improved spin coating machine and method of using the spin coating machine. This spin coating machine is a more compact, smaller footprint spin-coating machine that is capable of producing a pre-cured spin-coated lens having at least two coating layers. More particularly, described herein is a spin coating machine configured for spin coating a hard coat 1.5 mithril coating.

The spin coating machine described herein provides a dual layer spin coating solution in a small, compact, affordable package. The spin-coating machine can apply at least one layer of a coating, more particularly, at least two layers of a coating, for example a primer coat and a hard coating, to at least one substrate. The spin-coating machine can be configured to apply or deposit a primer and a hard coating from two different coating sources. The machine and method illustrated herein provides an advantage of being able to perform a spin coating process in small labs, such as those producing between 20-30 lenses per day, or integrated retail labs, at a reduced cost. These labs may have been previously unable to spin-coat lenses due the size of existing spin-coaters.

Other objects, features and advantages of the present invention will become apparent from the following detailed description. It should be understood, however, that the detailed description and the specific examples, while indicating specific embodiments of the invention, are given by way of illustration, since various changes and modifications within the scope described herein will become apparent to those skilled in the art from this detailed description.

A. Spin Coating System

Overall Housing

Figure 1:
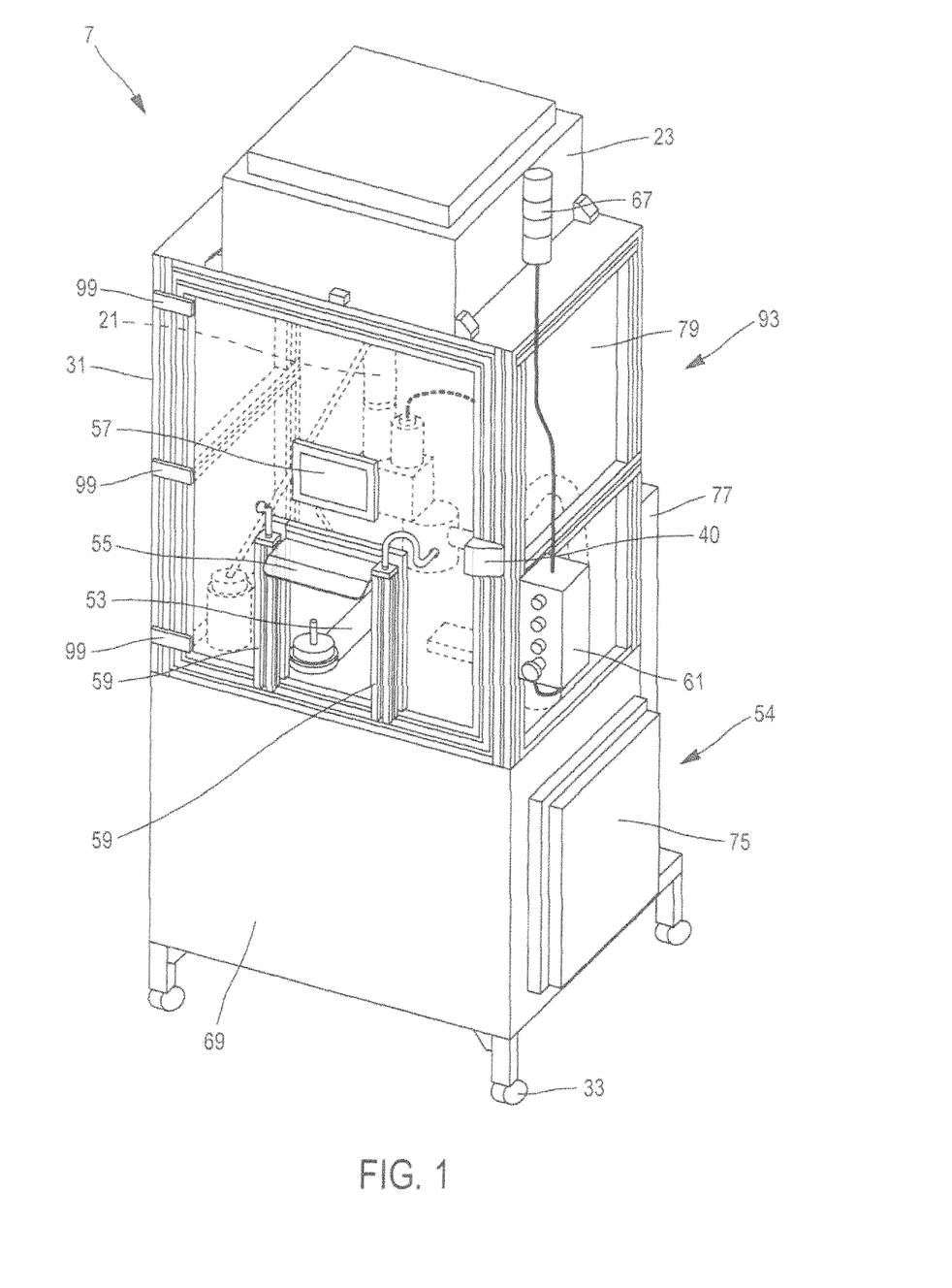
FIG. 1 is a perspective view of an exemplary spin coating system.

Referring to FIG. 1, an exemplary embodiment of a spin coating system 7 is illustrated. The spin coating system 7 comprises an upper portion 93 and a lower portion 54. The upper and lower portions further comprise a housing 31. In one embodiment the overall footprint of the spin coating system 7 can be about 42"×30" or between about 20 and 30 square feet, more particularly about 25 square feet. Other dimensional embodiments can be contemplated. The overall footprint of the spin coating system 7 is a smaller, more compact footprint, compared to standard spin coating machines. The machine disclosed herein is capable of providing spin-coating processes in a Class 10 enclosure. In one embodiment, the spin coating machine can be coupled with an AR280 machine.

Outer Lower Portion

The lower portion 54 of the spin coating system 7 comprises mechanical and electrical components (not shown or described in detail herein) that are important for the functioning of the spin coating system 7. These mechanical and electrical components are shielded within the lower portion 54 of the housing 31 by two sets of panels (i.e., a total of four guard panels 69). Each set of panels comprises two panels 69, each panel positioned opposite each other. The guard panels 69 enclose and protect the mechanical and electrical components of the lower portion 54. The guard panels 69 may be operably coupled to the aluminium frame housing 31. The panels are capable of being removed using a tool, such as, for example, a screwdriver. Alternatively, the panels 69 may be operably coupled to the housing 31 by at least one hinge such that they can be manually opened and closed. The guard panels 69 can be made of painted sheet metal or a substantially equivalent material.

The spin coating system 7 further comprises a control assembly that is positioned in the single control cabinet of the lower portion 54. In one aspect the control assembly can comprise a Siemens Simatic S7-1200 system. The control assembly comprises both high voltage and low voltage components. High voltage incoming power can be protected under a polycarbonate (PC) shield. Attached to a portion of one of the panels 69 is an electrical box 77 that further accommodates the electrical components contained in the lower portion 54.

The bottom portion 54 of the housing 31 of the spin-coating system 7 comprises a floor that may be further adapted to receive four wheels 33, each at a respective corner thereof to facilitate movement of the spin-coating system 7. The four wheels 33 are operably connected to and mounted on the bottom of the housing 31 of the system 7. Optionally each of the four wheels 33 can comprise a locking mechanism to secure the wheels 33 in a particular location. An exhaust volatile filter 19 (FIG. 5) can be positioned in the bottom portion 54 of the spin-coating system 7. Due to the air requirements for the system, a smaller version of filter units, compared to existing spin-coating machines, was used. A grate panel 75 is secured to a portion of one of the panels 69 to facilitate air communication between the exhaust volatile filter 19 and the exterior of the system 7.

Outer Upper Portion

The upper portion 93 of the housing 31 comprises an aluminum extrusion frame and two sets of transparent polycarbonate panels, thereby defining an upper interior 79 of the housing 31. Each set of transparent polycarbonate panels comprises two polycarbonate panels, each panel in an opposing position relative to each other. The transparent polycarbonate panels are positioned and secured to and between sections of the aluminum extrusion housing 31 frame. The polycarbonate panels are useful to allow an operator to observe a spin coating process, while at the same time allowing the spin coating process to be protected in a clean room Class 10 environment. In one embodiment the system 7 is configured to operate at 120/240 30 amps at 50/60 Hz in a clean pressurized air system equal to 5 CFM at 6 Bar.

The aluminum extrusion frame further comprises at least one interlocked access door 40. The door 40 can comprise a polycarbonate panel that is surrounded by an aluminum frame. The access door 40 is secured to the housing 31 on at least one side of the door 40 by at least one hinge 99. In one exemplary embodiment the door 40 can be secured by three hinges 99. The access door 40 is secured to the frame such that it can be pivotable about the hinge(s) 99, between open and closed positions, corresponding to open and closed positions of the door 40. The door is configured to be locked, if desired. The door 40 is configured to be manually actuated by a user using a securement means such as a lock or latch that is operably secured to at least a portion of the door 40 opposite the hinges 99. The door 40 enables a user to access the interior of the housing or coating chamber 79 between spin coating cycles.

The door 40 comprises an opening that allows an operator to access the interior of the housing or coating chamber 79 without opening the door 40. The opening is framed at least in part by at least one set of light curtains 53. The light curtains 53 are each powered by at least one light curtain power supply 59 and are operably connected to a light curtain control relay. In one embodiment the set of light curtains 53 can be about 300 mm in height. A safety shield 55 is positioned within at least a portion of the opening of the door and is coupled to the door 40. The safety shield 55 is positioned between the light curtain power supplies 59 such that the safety shield is oriented in a substantially perpendicular position relative to the power supplies 59. The safety shield 55 is composed of the same transparent polycarbonate material as the polycarbonate panels surrounding the interior chamber 79. The safety shield 55 comprises a first portion that is positioned at a substantially 90 degree angle relative to the opening of the access door 40 and a second portion that is positioned at an angle that is substantially 45 degrees relative to the opening of the access door 40. At least one system guard is mounted on the system housing 31 frame.

The upper portion 93 of the system comprises at least one HEPA (high efficiency particulate air) filter 23 that is positioned above the drying/cooling assembly 15 along substantially the same vertical axis in which the drying/cooling assembly 15 (described herein) is positioned, to capture any particulates. The HEPA filter 23 is useful for filtering out unwanted particles, thereby keeping the spin coating system clean. The HEPA filter 23 can be about 2 feet×2 feet in size and can have a filtration rating of 410 CFM (cubic feet per minute). The HEPA filter may be incorporated in and mounted onto at least a portion of the aluminum framework of the housing 31, as illustrated in FIG. 1. The system further comprises a vacuum system (not shown).

The system 7 further comprises an emergency power box 61 that is secured to at least an outside portion of the housing 31 frame. The power box 61 is electrically connected to, and positioned below, a light stack 67. In one aspect the light stack 67 comprises three different lights: red, green, and orange. The various colors of the light stack indicate the operational status of the system 7. The emergency power box 61 includes a plurality of control buttons, including an emergency-stop ("E-stop") button as well as a power-on button. The system 7 further comprises a pneumatics assembly that comprises a reduced sized Dominick filter.

GUI Interface

The system 7 further comprises a human/machine interface (HMI) or graphical user interface (GUI) 57 that is operably connected to the system 7. The GUI comprises a touch screen mounted onto at least a portion of one of the polycarbonate panels of the system. In one aspect the GUI is mounted to a polycarbonate panel of door 40. The touch screen of the GUI 57 can be approximately 7 inches in width. The GUI further comprises function buttons and status indicators, a layout of screen navigation, user interface screen descriptions and modes, and an error recovery mode. The GUI comprises the following basic screens: run screen, status/error/alarm screen, manual screens, and setup screens. The GUI screen can comprise a password protected screen that requires a user to access the screen when the correct entry is received. The passwords can be configured for any one of the following classifications: maintenance/engineer, production mode, or any other desired mode. The GUI is capable of receiving inputs from a user, such as, for example, dimensional information and spin coating recipes. The GUI is operably connected to a processer (not shown) which is capable of storing at least one recipe that can be used for coating the at least one substrate.

The system 7 comprises a custom software package that enables the running of the whole system. The software is used to program the GUI. The software controls the sequence of operations, process parameters, recipe structures, specifications for each user interface screen, including displayed data, and fault or status messages. The system can operate in manual mode or auto mode. The manual mode allows exercising of tool functions and toggling of input/outputs. The auto mode, the PLC, controls the process sequencing.

The system 7 allows for a basic level of error recovery, if needed. The error recovery mechanism can be built into the software system. The system may also comprise a plurality of system safeguards. The safeguards can enable a user to avoid safety issues and/or system shutdowns in case of malfunctioning in order to avoid compromising the quality of any coated lenses.

Figure 2:
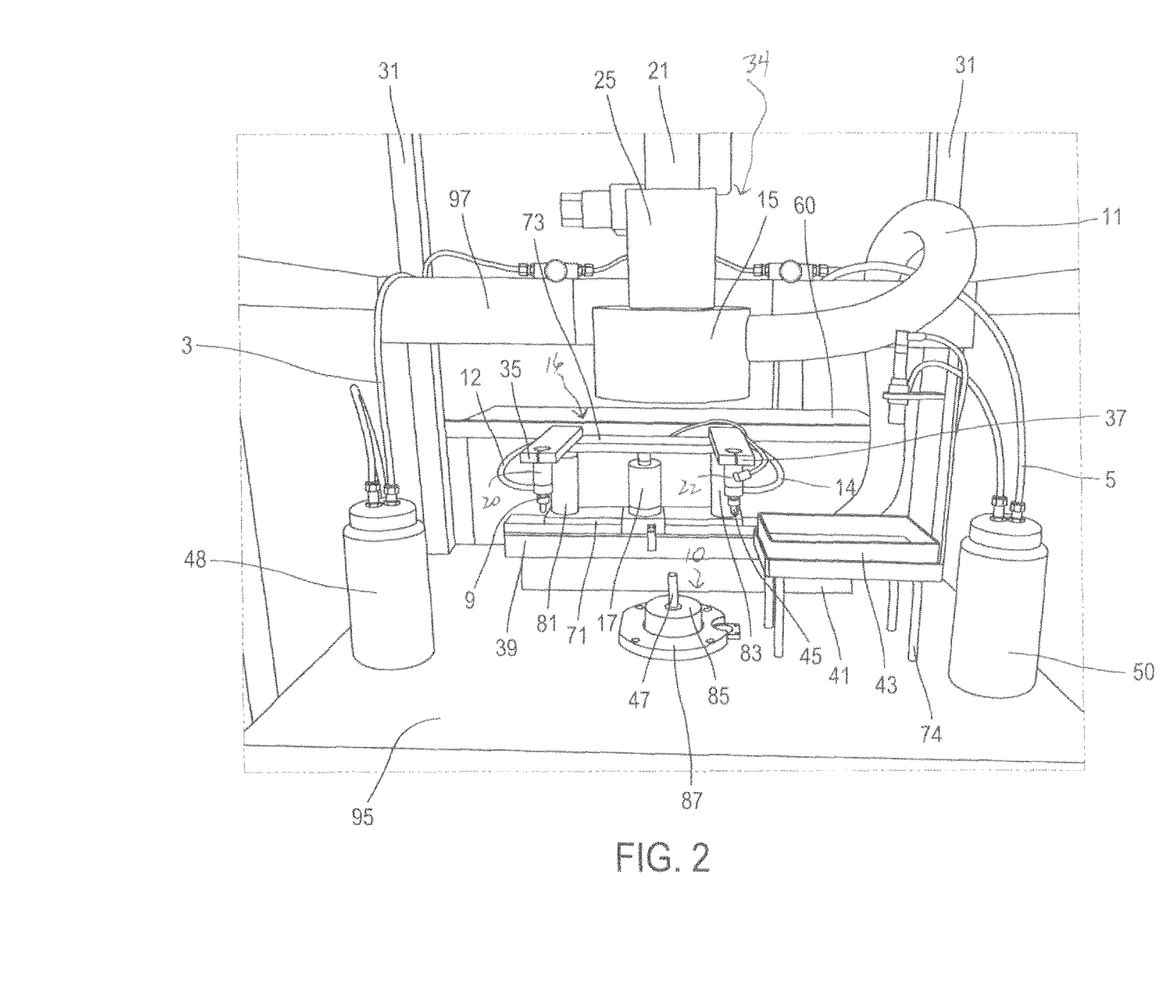
FIG. 2 illustrates an enlarged partial front view of the interior of the spin coating system of FIG. 1.

The upper portion 93 of the spin coating assembly 7 further comprises an interior coating application chamber 79. Referring to FIG. 2, located within the interior chamber 79 of the spin coating system 7 is a chamber platform 95 for mounting sub-assemblies, such as a dispensing arm assembly, substrate holder assembly, and single spindle assembly, described herein. Also positioned within the application chamber 79 are several support structures. A first support structure 97 is positioned behind the drying/cooling assembly 15 and parallel to the interior chamber platform 95. A second support structure 60 is positioned below support structure 97 and parallel to the interior chamber platform. The purpose of these support structures is to provide support for fluid conduits, tubing, and other components within the interior chamber 79, as well as to provide housing for various components of the system 7.

Dispensing Arm Assembly

A dispensing arm assembly 16 can be secured to the chamber platform 95. The dispensing arm assembly 16 comprises two arms 35, 37 having a first end and a second end. The first end of each arm 35, 37 is operably connected to an upper base 73, and the second end of each arm 35, 37 is operably connected to an applicator 20, 22, respectively. Applicators 20, 22 each have a first end and a second end. The first end of each applicator 20, 22 is operably connected to the arms 35, 37, and the second end of each applicator 20, 22 is operably connected to a dispensing valve 9, 45, respectively. Each applicator 20, 22 and dispensing valve 9, 45 is configured to apply at least one coating to at least one substrate in the coating chamber 79. In one exemplary embodiment, the applicators 20, 22 and valves 9, 45 are configured to apply a primer layer coating to the at least one substrate, followed by a hard coating. In an exemplary embodiment the spin-coating machine can apply more than two layers of a coating to each lens substrate. The coatings that are applied from each applicator 20, 22 can be the same coating or different coatings.

The dispensing arm assembly 16 can further comprise at least one central cylinder 17 as well as a second or left cylinder 81 and a third or right cylinder 83. Each of the cylinders 17, 81, and 83 has a first end and a second end. Each of the cylinders can be substantially the same height. The first end of each of the cylinders 17, 81, 83 is attached to an upper base 73, and the second end of cylinders 17, 81, 83 is attached to a lower base 71. Each cylinder 17, 81, 83 extends between the upper F 73 and lower base 71. The upper base 73 and lower base 71 can be substantially the same length. The upper base 73 and lower base 71 are positioned such that they are substantially perpendicular to cylinders 17, 81, 83. The cylinders 17, 81, 83 can be attached at a second end to a lower base 71. The upper and lower bases 71, 73 are positioned in a substantially parallel relationship to each other and to the interior chamber platform 65. The cylinders 17, 81, 83 connect the bases 71, 73 and provide support to the upper base 73 and the arms 35, 37. The cylinders 17, 81, 83 also provide housing for pneumatic assembly components that are located within the cylinders and allow the upper base 73 and arms 35, 37 to be vertically moved relative to the cylinders and lower base 71. The dispensing arm assembly 16 utilizes an Ethernet controlled stepper motor for positioning of the dispensing arm assembly. The dispensing arm assembly 16 also has a Cam and a follower arrangement which allows the arms 35, 37 of the dispensing assembly to move vertically upward toward the HEPA filter 23 and over the edge of a lubricating station 43, described herein. The dispensing arm assembly 16 further comprises a ballscrew driven linear actuator which has a 200 mm stroke, a 12 mm pitch, and a riser weldment.

Lower base 71 is moveably secured to a stationary track 39 that is supported by a track platform 41. The track 39 has a length. The upper and lower bases 71, 73 are shorter in length relative to the length of the track platform 39. The lower base 71 is adapted to move along the length of the track 39. The dispensing arm assembly 16 is adapted to move along the length of the track 39, while dispensing at least one coating solution onto a substrate.

Applicators of Dispensing Arm Assembly

Applicator 20 is located just above the applicator valve 9 for valve mounting, and applicator 22 is located just above the applicator valve 45 for valve mounting. Each of the applicators 20, 22 comprises a valve 9, 45 and a needle as well as a tip that is reusable. Each applicator/valve combination is referred to herein as an applicator assembly. Each of the applicators 20, 22 and valve 9, 45 is capable of dispensing a predetermined amount of at least one coating solution onto at least a portion of the lens substrate while the substrates are positioned in the coating application chamber 79. The dispensing arm assembly 16 further comprises a first clamp for valve end mounting and a second clamp for valve end mounting. The system further comprises a fluidics assembly having an SMC pressure sensor. The dispensing arm assembly is advantageous because it incorporates two dispensing applicators 20, 22 on a single dispensing arm assembly or transfer unit, thereby providing a more compact design, compared to existing spin-coating machines.

Coating Solution Sources

The system further comprises a first coating source or fluid dispenser 48 and a second coating source or fluid dispenser 50 in which at least one coating solution is contained in each source 48, 50. Each of the coating sources 48, 50 are capable of containing at least one coating solution, such as, but not limited to, a primer, hard coat, UV coating, or other types of coatings. The first coating source 48 is fluidly connected to and in fluid communication with the first applicator 20 and valve 9 via a means for fluid communication, such as fluid conduits 3, 12. The second coating source 50 is fluidly connected to and in fluid communication with the second applicator 22 and valve 45 via a means for fluid communication, such as fluid conduits 5, 14.

Lubricating Station

When each applicator assembly is not being used to dispense at least one coating solution onto at least one substrate, each of the applicator assemblies can be at least partially submerged in a means for lubricating at least a portion of the applicator assemblies. For example, the means for lubricating can be a liquid solution that is contained within the lubricating station 43. In one exemplary embodiment the liquid solution can be DI water, for instance. The DI water soak helps to maintain the lubricity of the applicator assemblies and helps to ensure that the applicator valves 9, 45 do not become coated in hardened liquid solutions. When not being used to dispense at least one coating solution, the first and second applicator valves 9, 45 of the applicator assemblies 20, 22 can be submerged in a DI water soak to prevent the applicators from being clogged with dried liquid.

The DI water soak can be contained in a container such as, but not limited to, a trough, for example, a stainless steel trough, that is part of the lubricating assembly 43. In one aspect the trough can be a rectangular open-facing container having a bottom portion and a top portion that is open toward the HEPA filter 23 and is configured to receive at least one solution. The trough can comprise four legs 74, each with a first end attached to a bottom portion of the trough and each with a second end, the second ends of which are attached to the chamber platform 95. The DI water soak can be manually maintained. Alternatively, the DI water soak can be automatically or electronically maintained via a sensor system so that the level of the DI water soak can be controlled. In one alternative embodiment, the DI water soak can be replenished manually or alternatively via an automatic replenishment system. The lubricating system 43 can be fluidly connected to an external tank that can be configured to contain the DI water, and the system 43 can also comprise a drainage system that is configured to automatically drain and replenish the DI water source. In one embodiment an adjustable timer can be included in the system 7 in order to notify a user when to drain the tank. The adjustable timer can be coupled to a PLC and can be used to notify an operator to change the DI water based upon a period of time, or it can notify an operator that the water is being drained and replenished by the external DI water source.

Spindle Assembly

Figure 4:
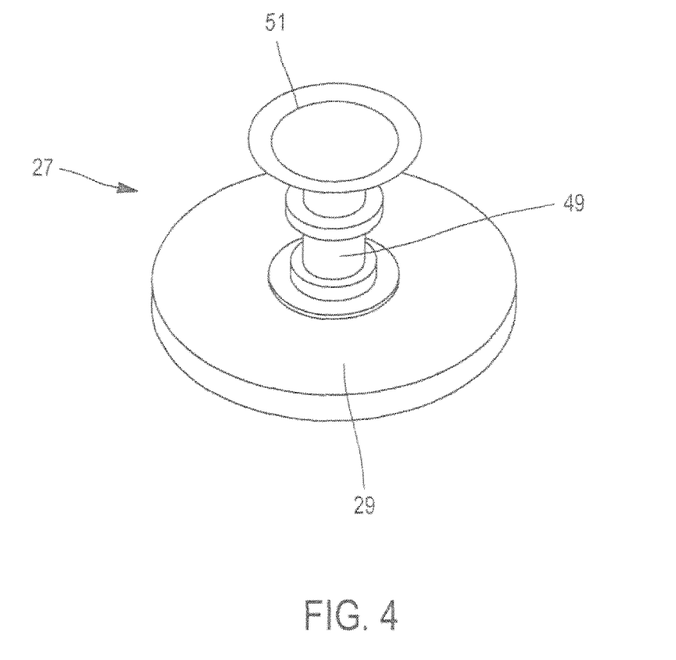
FIG. 4 illustrates a perspective view of a substrate holder assembly.

The interior 79 of the spin coating chamber 7 comprises a spindle assembly 10 which is configured to receive a substrate holder assembly 27 (FIG. 4). The spindle assembly can comprise a spindle base 87, a spindle platform 85, and a single spindle 47. The spindle base is attached to the chamber platform 95. The spindle platform 85 is circumferentially surrounded by the spindle base 87. The spindle platform has a height that is greater than the height of the spindle base 87. The single spindle 47 is circumferentially surrounded by the spindle platform 85. The single spindle 47 is capable of receiving the holder assembly 27. The single spindle 47 can be matingly coupled with a hollow opening of the substrate holder stem 49. The single spindle 47 passes through a spindle bearing and has its center aligned with a spin center of rotation of a lens blank (not shown) that is placed onto a portion of a suction cup 51 of a substrate holder assembly 27 when the substrate holder assembly 27 is secured to the spindle assembly. The rotation of a lens blank on the substrate holder 51 while the holder assembly 27 is coupled to the spindle 47, can be clockwise or counter clockwise, or both, on an intermittent basis, as determined by the type of lens and the coating material to be employed to coat the lens blank. The system described herein comprises a motor that is a servo motor that facilitates the movement of the spindle assembly. The three positions of the spindle assembly can be as follows: 1) an operator loading position (with the spindle 47 just above the spin bowl 63, described herein); 2) a dispensing position with the spindle 47 lowered into the spin bowl 63; and 3) a Dry/Cool Position, with the spindle 47 raised into the drying/cooling station 15. This three position spindle system utilizes a parker motor and drive system for the drive mechanism. The spindle assembly is positioned directly below the dry/cooling station 15 in the same substantially vertical axis as the drying/cooling station, which is mounted to the aluminum housing frame 31.

Spin Bowl

Figure 3:
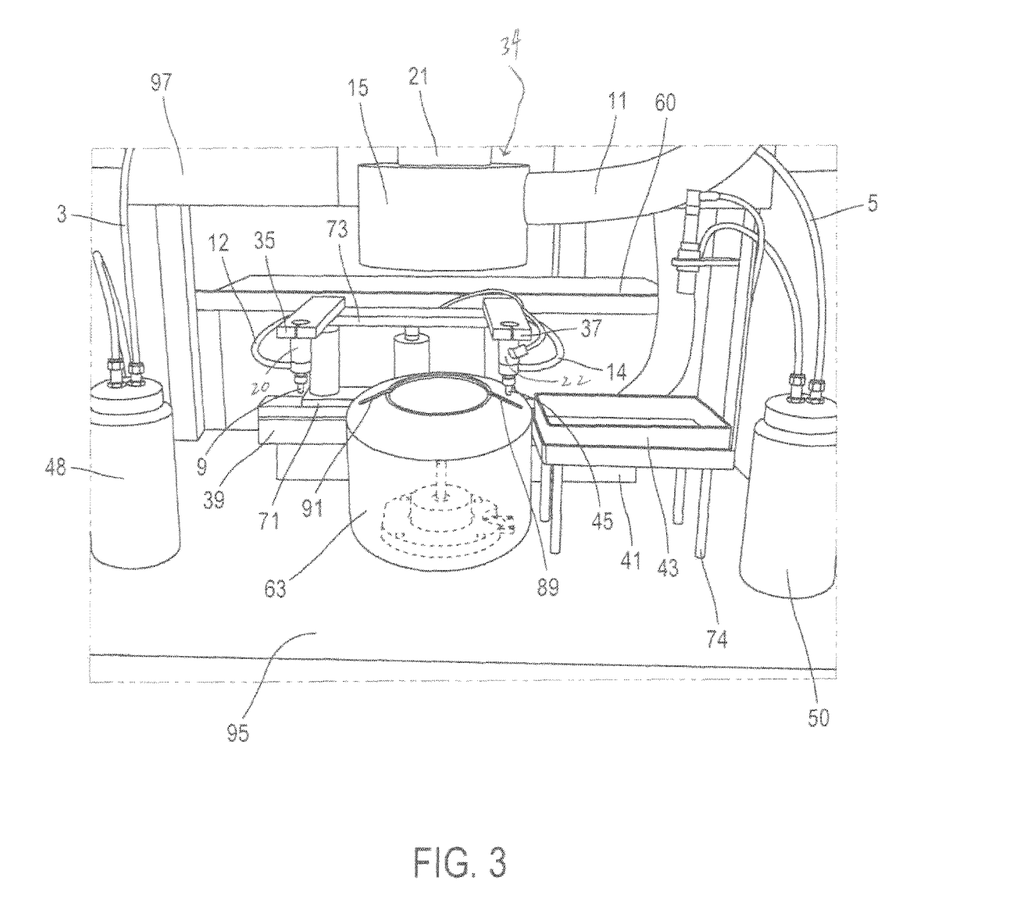
FIG. 3 illustrates an enlarged partial front view of the interior of the spin coating system of FIG. 1, with the addition of a spinning bowl.

Referring to FIG. 3, the interior 79 of the housing comprises a spin bowl 63. The spin bowl 63 is a substantially circular plastic bowl which substantially surrounds the spindle assembly 10 and the substrate holder 27 when the substrate holder 27 is coupled to the spindle assembly 10. The spin bowl comprises and upper portion and a lower portion and an opening positioned in the upper portion of the bowl. The upper portion faces the HEPA filter 23 and substantially surrounds the spindle assembly 10. The opening can be used to accommodate the substrate holder assembly 27 during the spin coating process. The spin bowl assembly 63 comprises at least one slit. In one embodiment the spinning bowl assembly 63 comprises two slits 89, 91 that are positioned opposite each other on either side of the opening of the spinning bowl 63 to accommodate at least a portion of at least one of the applicator assemblies 20, 22. The spin bowl assembly 63 is mounted on the chamber platform 95 such that it substantially surrounds the spindle assembly 87. The spin bowl 63 is configured to receive excess liquid solutions that are spun off from the substrate during the spin coating process from the applicator assemblies and to reduce polyurethane formulation. The bowl 63 thus also helps to prevent the liquid coating solutions from coating the processing equipment of the system 7. In particular, one spin bowl 63 can be used for both coatings, the primer and the hard coating.

Substrate Holder Assembly

Referring to FIG. 4, the interior or coating application chamber 79 of the housing further comprises a substrate holder assembly 27. The substrate holder assembly 27 is adapted to receive a substrate such as a lens. The substrate holder 27 comprises a circular base 29, a stem 49, and a suction cup 51. The stem 29 is positioned between and connected to the base 29 and the suction cup 51. The suction cup or substrate holder 51 is capable of receiving the at least one substrate. The holder 51 is made up of a chuck shaped to have a vacuum region in which a vacuum can be generated for holding at least one substrate such as a multifocal lens blank of a type having two focal regions: a first focal region and a second focal region which are defined relative to each other by what is known conventionally as a ledge line. The term "lens blank" is intended to mean the original unit from which a lens is made. The lens blank can have the lens cut from it, or it can be the same as the lens only requiring final processing such as coating for use as a lens. The substrate holder assembly 27 is configured to be mounted onto at least a portion of the spindle assembly 87. During the spin coating process the substrate holder assembly 27 rotates about a substantially vertical axis during the spin coating process.

Drying/Cooling Station

The system 7 further comprises a drying/cooling station assembly 34. The dry/cool station assembly 34 is configured to dry the lens after the lens has been coated with at least one coating solution. The drying/cooling assembly comprises a first portion 15 positioned above the dispensing arm assembly, a second portion 25 positioned directly above the first portion 15, and an air filter 21 connected to the second portion 25 and through which air is forced on to the coated surface of the lens to dry and/or cool the lens. A second air filter tube 11 is connected to the first portion 15.

The assembly 34 comprises a closing mechanism (not shown) that is attached to portion 15 of the drying/cooling assembly 34. The closing mechanism is capable of engaging when the spindle 47 is positioned in the dry/cool position. The closing mechanism comprises a set of two opposing paddles: one on a left side of the dry/cool duct 15 and one on a right side of the dry/cool duct. The dry/cool assembly also comprises a gripper body, a damper, and a heat blower. The dry/cool damper can be open or closed. The dry/cool station is capable of heating or cooling the lens, depending on what is desired. The dry/cool enclosure can be open or closed. The closing mechanism helps to provide a loose, non-air-tight seal underneath the dry/cooling station. When the dry/cool heater is in the "on" position, the closing mechanism is in the closed position, where each paddle is positioned in a substantially sealingly-engaged manner around the dry/cool ducting. The temperature of the drying/cooling mechanism can be controlled using the user input screen of the GUI.

Figure 5:
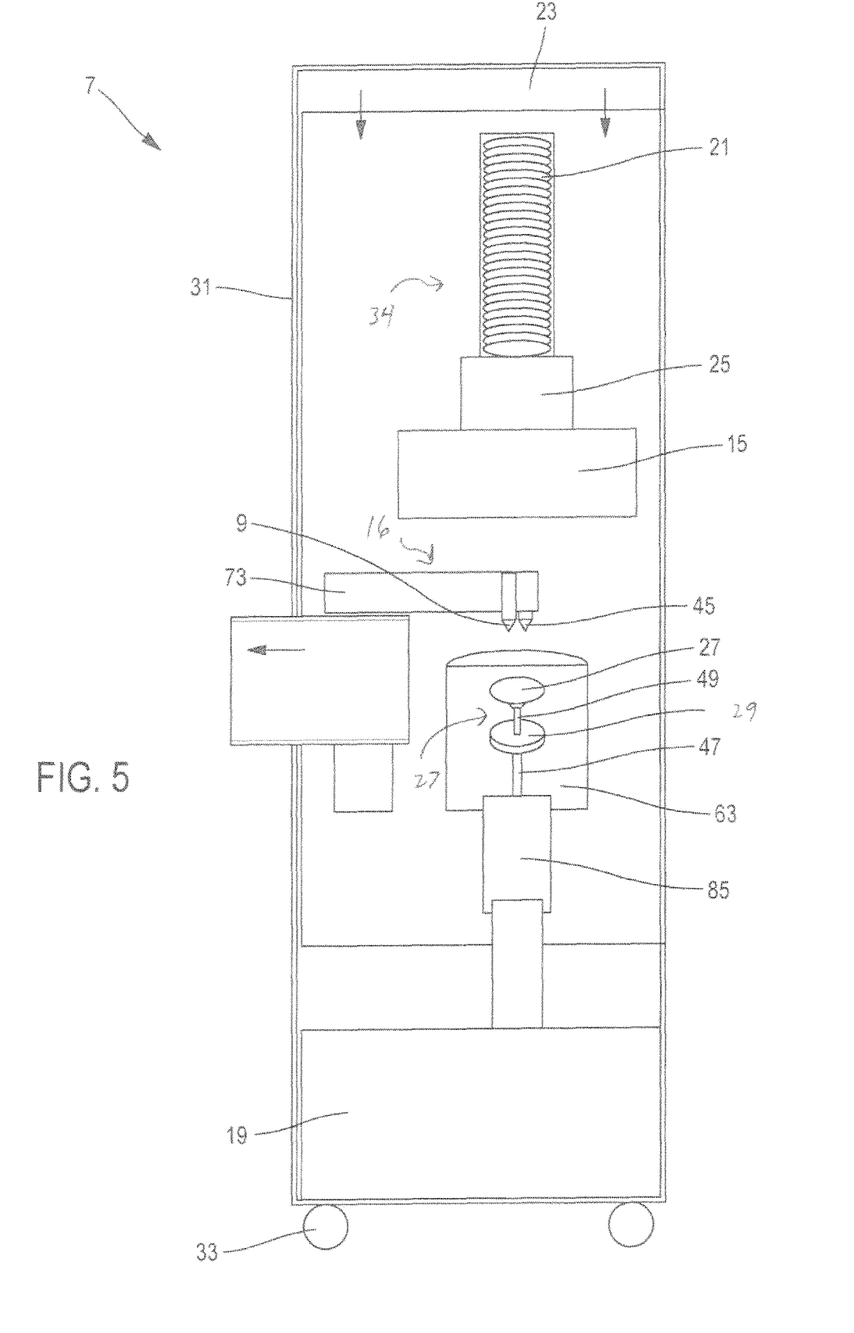
FIG. 5 illustrates a cross-sectional side view of the spin coating system comprising at least a drying/cooling assembly, a dispensing assembly, and a substrate holder assembly mounted on a spindle assembly.

Referring to FIG. 5, a side view of the system 7 is illustrated. The drying/cooling assembly 34, the dispensing assembly 73, comprising applicator assemblies 20, 22, and the spindle assembly 27 are all positioned along the same substantially vertical axis. The spindle assembly 27 may be raised and lowered along the substantially vertical axis, or moved from a first position to a second position in order to substantially coat and cool/dry at least one substrate. Positioned directly above the drying/cooling apparatus 15 and along the substantially vertical axis, is HEPA filter 23, as described above. The substrate holder 27 is positioned directly below the drying/cooling apparatus and is positioned along the same substantially vertical axis as the drying/cooling apparatus 15. As indicated by the arrow extending outward from the dispensing assembly 16, positive air flow is directed away from system 7.

Optional Curing Chamber

Figure 6:
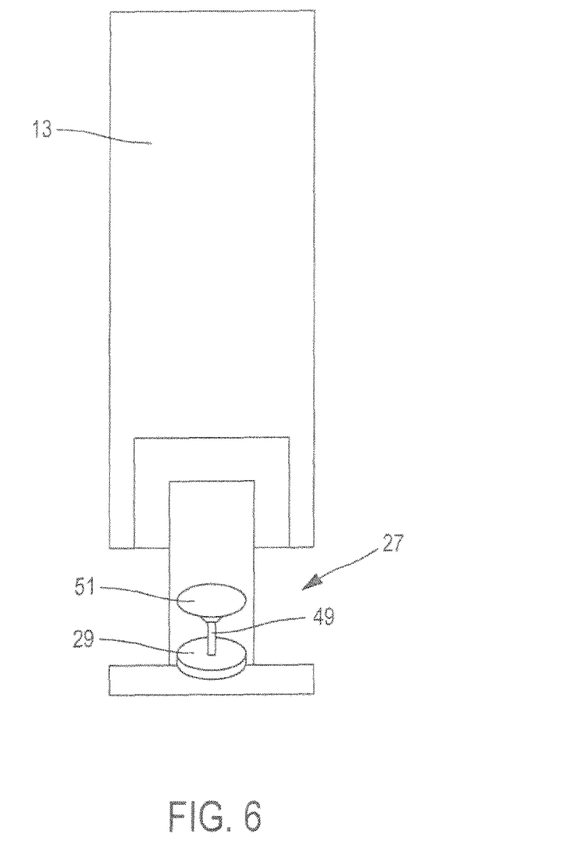
FIG. 6 illustrates an optional curing assembly to be used with the spin coating system.

Referring to FIG. 6, in one embodiment, optionally, after the at least one substrate is coated with at least one coating, the substrate can be removed from the lens holder assembly 27 and cured at a desired temperature range for a desired time period in a curing chamber 13. The cured lenses can have any suitable or desired thickness.

B.—Spin Coating Method

Figure 7:
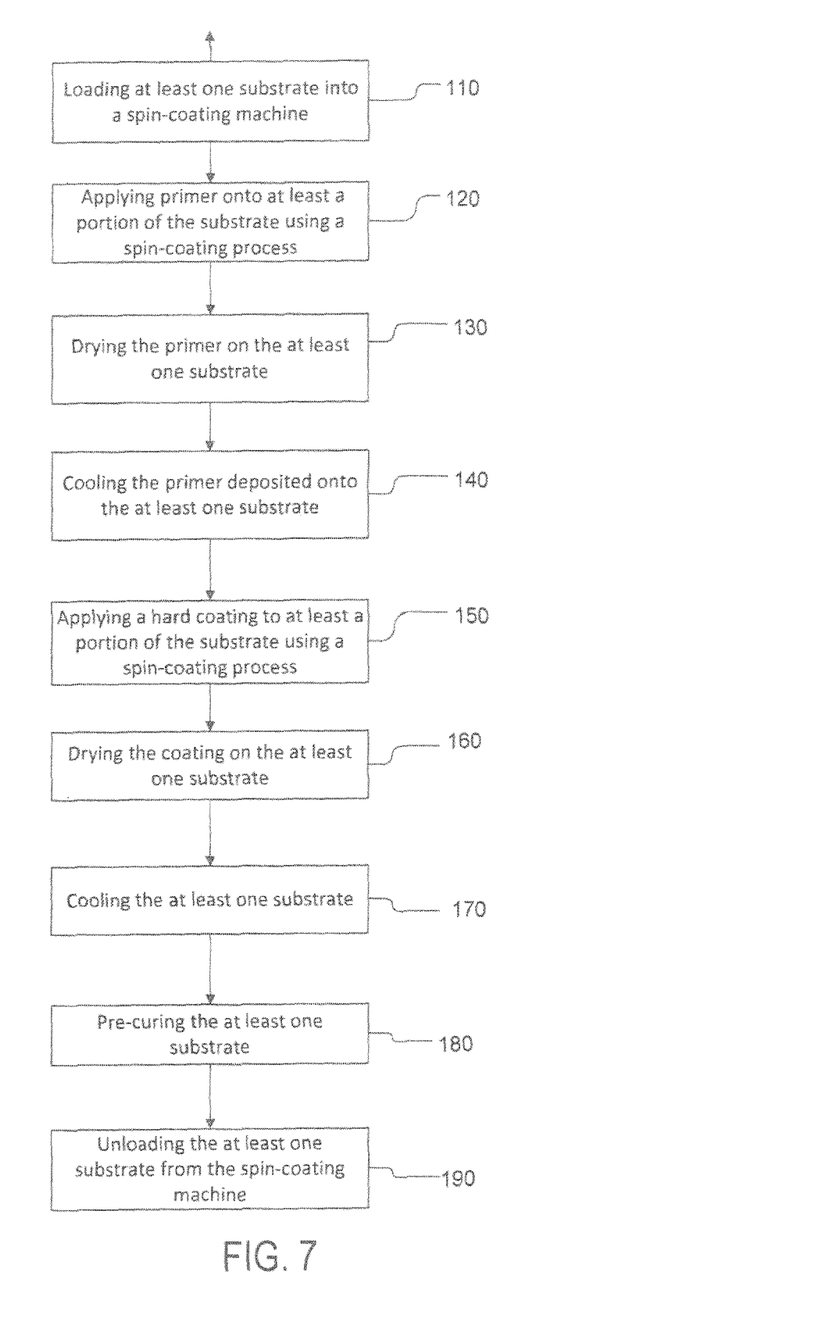
FIG. 7 illustrates a method of spin-coating at least one substrate.

Referring to FIG. 7, the method of using the spin coating system described herein includes providing at least one substrate, where the substrate is an optical article, such as, but not limited to, an ophthalmic lens. The optical substrate may be an organic glass substrate comprising, for example, a thermoplastic or a thermosetting material. Thermoplastic materials that may be suitably used for the substrates include (meth)acrylic (co)polymers, especially methyl poly(methacrylate) (PMMA), thio(meth)acrylic (co)polymers, polyvinylbutyral (PVB), polycarbonates (PC), polyurethanes (PU), poly(thiourethanes), polyol allylcarbonate (co)polymers, thermoplastic copolymers of ethylene and vinyl acetate, polyesters such as polyethylene terephtalate (PET) or polybutylene terephtalate (PBT), polyepisulfides, polyepoxides, copolymers of polycarbonates and polyesters, copolymers of cycloolefins such as copolymers of ethylene and norbornene or ethylene and cyclopentadiene, and combinations thereof.

As used herein a "(co)polymer" means a copolymer or a polymer. A (meth)acrylate is an acrylate or a methacrylate. Other exemplary substrates according to the invention include, for example, substrates obtained by polymerizing alkyl(meth)acrylates, especially $C_1$-$C_4$ alkyl(meth)acrylates, such as methyl(meth)acrylates such as polyethoxylated bisphenol di(meth)acrylates, allyl derivatives such as aliphatic or aromatic, linear or branched polyol allycarbonates, thio (meth)acrylates, episulfides and precursor mixtures of polythiols and polyisocyanates (for obtaining polythiourethanes).

As used herein a "polycarbonate" (PC) means both the homopolycarbonates and the copolycarbonates and the block copolycarbonates. Suitable examples of polyol allyl carbonate (copolymers include (co)polymers of ethylene glycol bis(allyl carbonate), of diethylene glycol bis 2-methyl carbonate, of diethylene glycol bis(allyl carbonate), of ethylene glycol bis(2-chloro allyl carbonate), of propyleneglycol bis(2-ethyl allyl carbonate), of 1,3-butenediol bis(allyl carbonate), of 1,4-butenediol bis(2-bromo allyl carbonate), of dipropyleneglycol bis(allyl carbonate), of trimethylene glycol bis(2-ethyl allyl carbonate), of pentamethylene glycol bis(allyl carbonate), of isopropylene bisphenol-A bis(allyl carbonate).

Particularly recommended substrates are those substrates obtained by (co)polymerizing bis allyl carbonate of diethylene glycol, marketed, for example, under the trade name CR-39® by PPG Industries (ESSILOR ORMA® lenses). The particularly recommended substrates also include those substrates obtained by polymerizing thio(meth)acrylic monomers, such as those described in the French patent application FR 2734827. The substrates may be obtained by polymerizing mixtures of the hereinabove mentioned monomers, or they also may comprise mixtures of such polymers and (co)polymers. Exemplary substrates are those made of a crosslinked material (thermosetting material); especially allylic, (meth)acrylate type, thio(meth)acrylate type or poly (thio)urethane substrates.

In one exemplary embodiment an Orma® lens substrate (obtained by polymerizing CR-39° diethylene glycol bis ((allyl carbonate) monomer) can be used. The ORMA lenses can be coated with an abrasion-resistant and/or an anti-scratch coating ("Mithril" hard coat), such as that disclosed in example 3 of EP 0614957.

Before the spin-coating process is used, after at least one substrate is provided, any lens substrates to be spin-coated are inspected and cleaned. Substrates may be coated singly, or a plurality of substrates may be simultaneously coated. The substrate has one or more primary faces, including a front side (convex surface), a back side (concave surface), edges and any combination thereof. As also used herein, the "rear face" (typically concave) of the substrate means the face which, in the final article, is located the nearest to the user's eye. "Front face" (typically convex) of the substrate means the face which, in the final article, is the most distant from the user's eye.

The substrate onto which the coating described herein is deposited may be any substrate capable of receiving the materials described herein. In some embodiments, the substrate may be transparent. In some embodiments, the substrate may be an optical article. The substrate may be a lens, such as an ophthalmic lens or lens blank. The term "lens" as used herein generally means an organic or inorganic glass lens, preferably an organic lens, comprising a lens substrate which may be initially coated or partially coated with one or more coatings of various natures.

The method further includes loading (110) at least one substrate onto the substrate holder 27, more particularly, the suction cup 51 of the substrate holder 27 and placing the substrate holder 27 onto the spindle 47 that is located within the housing of the spin-coating machine such that the concave face of the lens faces upward toward the top of the spin-coating machine. An operator can then enter the coating process parameters into the graphical user interface (GUI). The operator then selects the appropriate predetermined coating dispensing parameters on the GUI. The operator begins the coating process by pressing the "cycle start" on the graphical user interface operator's panel in order to start the process. The spindle assembly 10 lowers into the spin bowl 63.

The method further involves applying (120) a coating solution, such as a primer layer, onto at least a portion of the substrate using spin-coating. This is accomplished when first applicator assembly 20 moves from a first position to a second position such that it is positioned substantially in the same axis as the lens substrate. The spindle 47 then begins spinning the lens holder at a predetermined set RPM such that an appropriate amount of coating solution is dispensed onto the lens substrate. The dispensing arm assembly 16 first applies a primer coating from a valve 9 positioned on the applicator assembly 20 to the lens that is spinning in bowl 63. During the spin coating process at least one coating is applied to the substrate when the lens, mounted on lens holder cup 51 positioned on a rotatable spindle assembly 87, is rotated at a high speed to disperse the coating liquid over the moving surface of the lens to attain a coating of uniform thickness.

The coating solutions that are applied to the surface of the substrates from the coating sources 48, 50 can be thermally curable. The viscosities of the primer layer can be in the range of 1 to 100 cp at 25° C. In one aspect the primer that is applied to the surface of the at least one substrate can be a latex primer. The primer can be applied to the surface of the substrate first as a light layer of latex to help scratch coatings or other coatings adhere to the surface of the lens. The coating solutions that are applied to the substrate are selected from the group of solutions of primer layer latex comprising functions selected from the group consisting of urethane, (meth)acrylic and butadiene, solutions of liquid crystal material and solutions of polarizing material.

The method further includes drying (130) the applied primer on the at least one substrate; and cooling (140) the at least one substrate. To accomplish this, the primer coated lens that is coupled to the holder 51 is positioned (raised) directly above the bowl 63 into a portion of the drying/cooling station 34. The primer-coated lens rotates while the lens is subject to a thermal filmification (drying) using heat, air flow and cooling. After the lens is heated, dried, and cooled, the lens, along with the substrate holder assembly 27 is then returned (lowered) into the bowl 63, and the second hard coat layer is applied (150) using a second applicator valve 45 from the second applicator assembly 22 to the at least one substrate by spin-coating (150). The dispensing arm assembly 16 is moved in a pre-programmed pattern relative to the position of the lens substrate. More particularly, the application of the second hard coating onto at least a portion of the lens involves lowering the spindle assembly 10, along with the lens that is attached to the substrate holder 27 assembly, into the spin bowl 63, and the second applicator assembly 22 moves from a first position to a second position such that it is positioned in substantially the same axis as the lens substrate. The spindle 47 begins spinning at a predetermined RPM. The dispensing arm assembly 16, through the applicator assembly 20, dispenses or applies a predetermined amount of coating solution onto the lens substrate. Upon completion of the dispensing process, the dispensing arm assembly moves back to the first position.

The method further involves drying (160) the substrate, and cooling the at least one substrate (170). This is done when the lens is returned to the drying/cooling station 34 directly above the applicator to apply heating, air flow, and cooling to the lens to modify the state of the hard coat by partially polymerizing the coating, thereby providing a tack free coating on the lens substrate. When the lens substrate is positioned within a portion of the drying/cooling station 34, particularly within portion 15, the paddles on the drying/cooling system 34 close to help contain warm air in within the chamber 79. The spindle 47 spins at a pre-programmed speed to present the lens substrate to the forced air produced by the drying/cooling station. The drying/cooling system 34 performs a pre-programmed sequence to dry the applied coating using warm air and then cooling down the lens for the next application. This allows the lens to be more easily handled. The spindle 47 then stops spinning. The paddles on the drying/cooling assembly 34 open to allow the spindle assembly 10 to move back into the spin bowl 63. The spindle assembly 10 moves or lowers back into a load position to allow an operator to unload the lens holder 27 containing the coated lens. The process further involves optionally thermally pre-curing the at least one substrate to solidify the tack-free coating on the substrate (180).

This step is followed by unloading the at least one substrate from the spin-coating machine (190). The system 7 provides a signal to an operator that the lens holder 27 is ready to be unloaded from the machine. The lens and holder assembly 27 is then removed from the system 7. The lens is manually detached from the holder assembly 27 and can be further post-cured using any number of existing technologies to provide the coated lens with 1.5 Mithril hard coat properties on the concave side of the lens. The advantage of this system 7 is that it provides for the alignment of several functions (i.e., coating, drying, cooling, etc.) on the same substantially vertical axis. This enables the system to have a small footprint for space savings and provides a low-cost solution for applying a two layer thermally cured hard coating to a lens. Further drying and/or partial curing of both layers is achieved in the same oven assembly.

The process described above produces a lens comprising a primer and a hard coat that is pre-polymerized for handling and comprises a proprietary "Mithril" state after post-cure. This is a necessary state of Essilor hard coat for processing into Essilor proprietary "Crizal" lenses. Smaller lens processing labs can use this machine to provide 1.5 Mithril properties on the back side surface of ophthalmic lenses. This is an essential (and unique to Essilor) step in providing Crizal capability for small labs. In one exemplary embodiment about 60 lens pieces or 30 pairs of lenses can be coated per 8 hour day. Each lens can be coated in about 3 minutes. In one embodiment the total cycle time of the spin-coating process described herein (FIG. 7) can be between 2 and 5 minutes. More particularly, the spin-coating process can be three (3) minutes. Any type of lens can be coated using this machine. In one exemplary embodiment polycarbonate and Orma lenses can be coated. The machine can also coat bifocals and trifocals.

The coating, when formed on the at least one substrate can be a thin film coating, an anti-reflection (AR) coating (i.e., Crizal® AR coating), a reflection (mirror) coating, a beam-splitter coating, a filter coating (e.g., bandpass filter, dichroic filter, neutral density filter, longpass filter, and shortpass filter coatings) (collectively "coatings").

The methods of coating a substrate and systems described herein provide several benefits. The methods and systems described herein provide a more compact smaller-footprint spin backside coating unit that is especially useful for smaller-scale lens manufacturing facilities and labs. This allows smaller labs to spin-coat lenses without requiring a large manufacturing facility. It also results in reduced facility and construction costs due to diminished clean room requirements, while maintaining high product standards. The system described herein can be manufactured at a much lower cost compared to standard industrial size spin-coating machines which is more appealing for smaller labs. This improved spin backside mithril coating unit (S-BSM) and method expands the opportunity in-house processing of lenses such as, but not limited to, Crizal for small, independent laboratories by allowing a reduction in facility and construction costs due to diminished clean room requirements, while maintaining performance standards.

The particular examples disclosed above are illustrative only, as the present invention may be modified and practiced in different but equivalent manners apparent to those skilled in the art having the benefit of the teachings herein. It is, therefore, evident that the particular illustrative examples disclosed above may be altered or modified and all such variations are considered within the scope of the present invention. The various elements or steps according to the disclosed elements or steps can be combined advantageously or practiced together in various combinations or sub-combinations of elements or sequences of steps to increase the efficiency and benefits that can be obtained from the invention.

It will be appreciated that one or more of the above embodiments may be combined with one or more of the other embodiments, unless explicitly stated otherwise. The invention illustratively disclosed herein suitably may be practiced in the absence of any element or step that is not specifically disclosed or claimed. Furthermore, no limitations are intended to the details of construction, composition, design, or steps herein shown, other than as described in the claims.

The invention claimed is:

1. A system for spin-coating at least one substrate, the system comprising:
   at least one holder assembly configured to receive the at least one substrate and spin or rotate the at least one substrate, wherein the holder assembly is moveable along a substantially vertical axis; and
   a dispensing arm assembly comprising:
      a base; and
      at least one arm having a first end and a second end, wherein the dispensing arm assembly is moveable along a horizontal axis, and wherein the at least one arm is operably coupled to the base at the first end and operably coupled to at least one applicator that is in fluid communication with one coating solution at the second end, and wherein the at least one applicator is capable of being positioned along the substantially vertical axis so as to coat at least the coating solution onto the substrate and to obtain a coated substrate;
   wherein the system comprises a drying and cooling assembly that is positioned along said substantially vertical axis and that forces air onto said coated substrate following coating solution application by the at least one applicator.

2. The system of claim 1, wherein the at least one arm is coupled to the at least one applicator comprising at least a first applicator and a second applicator, wherein said first applicator and said second applicator are positioned in a substantially parallel relationship to each other.

3. The system of claim 2, wherein each of the first and second applicators are configured to dispense at least one coating solution onto at least a portion of the at least one substrate.

4. The system of claim 3, wherein the coating solution is a primer layer latex comprising urethane, (meth)acrylic, and/or butadiene functions.

5. The system of claim 1, wherein the system further comprises:
   a housing defining an interior, wherein the interior comprises:
      a platform, wherein the platform is substantially parallel to the at least one substrate;
      a spindle assembly comprising at least a single spindle that is configured to receive the at least one holder assembly; and
      the dispensing arm assembly, wherein the spindle assembly and the dispensing arm assembly are each secured to at least a portion of the platform.

6. The system of claim 1, wherein the system further comprises at least one container capable of containing the at least one coating solution, wherein the at least one container is in fluid communication with the at least one applicator.

7. The system of claim 1, wherein the system further comprises a lubricating station, wherein the lubricating station comprises a means for containing at least one lubricating solution for lubricating the at least one applicator, and wherein at least a portion of the lubricating station is secured to at least a portion of a platform.

8. The system of claim 5, wherein the system further comprises at least one graphical user interface (GUI), wherein the graphical user interface is secured to at least a portion of the housing.

9. The system of claim 3, wherein the coating solution is a primer layer latex comprising a liquid crystal material.

10. The system of claim 3, wherein the coating solution is a primer layer latex comprising a polarizing material.

11. The system of claim 3, wherein the coating solution is a primer layer latex comprising a hard coating.

12. The system of claim 3, wherein the coating solution is a primer layer latex comprising a UV-curable coating.

13. A method for spin-coating at least one substrate by using the system for spin-coating according to claim 1, the method comprising:

providing the system of claim 1;
providing at least one substrate and positioning the at least one substrate onto at least the holder assembly along a substantially vertical axis in a first position;
depositing a primer layer onto at least a portion of the substrate using a first applicator of the at least one applicator, while rotating the substrate;
moving the substrate along the substantially vertical axis to a second position;
drying and cooling the substrate in the drying and cooling assembly;
moving the substrate along the substantially vertical axis to the first position; and
depositing a coating solution onto at least a portion of the substrate using a second applicator of the at least one applicator, while rotating the substrate.

14. The method of claim 13, wherein the method further comprises moving the at least one substrate along the substantially vertical axis to the second position along the substantially vertical axis; and drying and cooling the at least one substrate.

15. The method of claim 14, wherein the method further comprises pre-curing the substrate.

16. The method of claim 13, wherein the method of applying the coating solution further comprises applying a hard coating solution.

* * * * *